(12) United States Patent
Runels (10) Patent No.: US 6,345,699 B1
(45) Date of Patent: Feb. 12, 2002

(54) BRAKE ACTUATOR SERVICE LIMIT SENSOR

(75) Inventor: Thomas Lee Runels, Battle Creek, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/471,154

(22) Filed: Dec. 23, 1999

(51) Int. Cl.[7] ............................................... F16D 66/00
(52) U.S. Cl. ........................... 188/1.11 L; 188/1.11 E; 116/208; 200/574
(58) Field of Search ...................... 188/1.11 W, 1.11 L, 188/1.11 E, 1.11 R; 116/208, 281, 283; 200/61.4, 47, 61.41, 61.89, 573, 574

(56) References Cited

U.S. PATENT DOCUMENTS

| | | | |
|---|---|---|---|
| 3,298,466 A | * | 1/1967 | Ayers et al. ............. 188/1.11 L |
| 5,207,299 A | * | 5/1993 | Feldmann ................ 188/79.55 |
| 5,226,312 A | * | 7/1993 | Gautier et al. ........... 188/1.11 L |
| 5,226,509 A | * | 7/1993 | Smith ..................... 188/1.11 L |
| 5,253,735 A | * | 10/1993 | Larson et al. ............ 188/1.11 L |
| 5,310,023 A | * | 5/1994 | Martinez ................. 188/1.11 L |
| 5,339,069 A | * | 8/1994 | Penner et al. ............ 188/1.11 L |
| 5,477,945 A | * | 12/1995 | Klass et al. .............. 188/79.51 |
| 5,934,415 A | * | 8/1999 | Preston et al. ........... 188/1.11 L |
| 6,023,025 A | * | 2/2000 | Nakahigashi et al. ... 174/110 R |

* cited by examiner

Primary Examiner—Robert J. Oberleitner
Assistant Examiner—Devon Kramer
(74) Attorney, Agent, or Firm—Liniak, Berenato, Longacre & White (57) ABSTRACT

A brake actuator having a switch device mounted to an actuator housing with a C-shaped molded body and a C-shaped spring member partially surrounding an actuator rod and adapted to contact a large diameter section of the actuator rod when brake wear causes the actuator rod to travel to a service limit position. In normal operation the spring member is separated from a small diameter section of the actuator rod. The switch device is mounted at an open end of the molded body and spring member and comprises first and second electrical contacts which extend and electrically contact each other as long as the brake actuator rod has not traveled to the service limit. When the push rod ahs traveled to its service limit, a large diameter portion of the push rod forces the contacts apart thus opening the electric circuit.

16 Claims, 5 Drawing Sheets

BRAKE ACTUATOR SERVICE LIMIT SENSOR

BACKGROUND OF THE INVENTION

1. Field of the Invention

The present invention relates to a system to measure the condition of a vehicle brake and, more specifically, to a system to detect and generate an electrical signal when the brake actuator travel exceeds a predetermined limit thereby indicating the need for brake service.

2. Description of the Prior Art

The mechanical adjustment of air brakes on trucks and other highway vehicles is a constant source of concern to vehicle owners, drivers and public officials whose duty it is to inspect and to check the road worthiness of such vehicles. In the case of air brakes, various devices have been designed to assist and to expedite the process; some of which are very simple, others of which tend to be relatively complex and, in all likelihood, relatively costly.

A common type of air brake system for trucks utilizes an actuator associated with each brake. The actuator has an opening in one side through which an actuator rod extends, the actuator rod being in turn connected to the actual vehicle brake through a suitable mechanical linkage such as an automatic slack adjuster that is well known in the art. When the vehicle brakes are not being applied, a spring or the like within the actuator holds the push rod in a relatively retracted position when the brake is off. However, when an operator applies the brakes, pressurized air is supplied to the actuator and the pressurized air causes the actuator rod to move along its longitudinal axis, in a direction out of the actuator. This movement continues until the brake engages and provides a return force that balances the force provided by the air pressure.

As the brake wears, the push rod must move through a larger and larger distance from its retracted position to an extended position in which the brake is applied. An automatic slack adjuster takes care of a certain amount of linkage adjustments due to wear but if the process continues uncorrected, the actuator rod travel will gradually reach its upper limit, determined by the geometry of the actuator. When this occurs, the brakes will not be effective even when fully applied by the vehicle operator. Because of this, in the U.S., trucking regulations place an upper limit of two inches on the maximum amount of actuator rod travel between its retracted and extended positions.

Two basic types of solutions have been provided to address the problem of wear in air brake systems. The first of these solutions is a device known as a slack adjuster that is included in the linkage between the actuator rod and the brake. A slack adjuster removes slack from this linkage, thereby reducing the amount of actuator rod travel necessary before the brakes are applied. Both automatic and manual slack adjusters are well known and in use. In an automatic slack adjuster, the slack removal operation is automatic, and occurs whenever a predetermined degree of slack develops in the linkage. However, an automatic slack adjuster is a relatively expensive and complex device, and is subject to occasional malfunction. A manual slack adjuster must be adjusted manually whenever excessive actuator rod travel develops in the brake system. However in general, an operator has no means of readily determining when such wear exists.

In order to overcome the limitations of existing slack adjusters or for use with manual adjustment systems, a variety of brake wear indicators have been devised to provide an indication to an operator that excess actuator rod travel has developed. For example, it is known to provide a brake wear indicator that comprises a sleeve that extends around the actuator rod and through the opening in the actuator through which the actuator rod extends. A relatively loose fit is provided between the indicator and the actuator rod, and a comparatively snug fit is provided between the indicator and the actuator. When the brakes are applied, the indicator is forced out of the actuator along with the actuator rod. When the brakes are subsequently released, the fit between the indicator and the actuator prevents the indicator from retracting. Thus at any given time, visual inspection of the indicator will indicate the maximum travel of the actuator rod since the indicator was last reset into its retracted position. While effective in principle, the prior art brake wear indicator suffers from the problem that there is considerable variation in the size of the opening in the side of the actuator through which the actuator rod extends. Thus, in practice, indicators of various outside diameters must be provided in order to cover the different brands and models of actuators currently in use. In addition, no electronic signal is generated that can be used to alert the operation or the need for service without a visual inspection of each brake assembly.

One of the simplest kind of devices is a split ring plastic sleeve designed to slip over the air pressure chamber actuator rod, and thereafter provide a visual indication of actuator rod travel distance or stroke extension. Excessive actuator rod travel indicates a level of brake lining wear that warrants replacement of the linings. Another device, which likewise acts as a visual indicator, involves modification to the actuator rod itself. A colored band is painted into a groove circumferentially machined in the actuator rod.

Another conventional brake wear indicator comprises an extension of the return spring of the actuating cylinder that extends from the interior of the actuating cylinder to the exterior where it is visible for inspection. When the brakes are applied, the return spring is compressed and the extension projects from the actuating cylinder. The greater the distance the extension projects the greater the wear of the brake linings.

The foregoing and other visual indicators are disadvantageous by reason of their dependence on vision. The ability to see can be hampered by darkness, or by dirt, mud or slush picked up form the road. Further, it can be an awkward and sometimes messy job to move into a position that enables a visual check to be made. Also, more importantly, no warning is given to the operator in the cab so that immediate service can be obtained.

Prior art slack adjusters have used switching devices to signal when the brake adjuster has reached the end of its available travel thereby signaling the need for brake service. The switch, which is mounted to the slack adjuster, is electrically connected to a monitoring device using two connecting wires. These types of devices function to electrically signal when the brake slack adjuster has traveled to its service limit thereby notifying the operator of the need for brake service.

Another method of signaling when brake service is required is a system to monitor the travel of the pushrod of the brake actuator. In one such device, a magnet is secured to the actuator rod of a brake actuator which magnetically activates a switch mounted to the housing of the brake actuator when the rod travels to its service limit. The switch is connected to an electronic circuit to alert the operator of the need for brake service.

These and other prior art systems have the limitations of overly complicated structures that must be supported and are prone to failure. In the case of visual systems, no signal is directly available to the driver while operating the vehicle which could result in an overworn brake condition prior to a service inspection.

SUMMARY OF THE INVENTION

The present invention provides an apparatus for electronically signaling when excessive brake wear has occurred in a brake of the type which uses a moveable actuator rod to displace an actuator linkage to activate the brake. A switch is mounted to the actuator housing so as to engage a specific increased diameter section of the actuator rod when the travel of the rod approaches or exceeds a predetermined service limit although the switch can be of the type known in the art as "normally closed" or conversely of the type known as "normally open" depending on the nature of the signal to be provided to the monitor electronics. In the preferred embodiment, the switch is normally closed by action of a molded body and a spring member which encircle the actuator rod although the switch is activated by the action of the body/spring which hold the switch in an activated position when the actuator travel is within prescribed operational limits. When the spring contacts a larger diameter section of the rod, the spring and molded body are moved to open the switch to signal when the actuator rod has reached a service limit position and the brakes need replacement or further adjustment.

According to the present invention, a pair of contacts is mounted within an open end of a C-shaped spring member which encircles the smaller diameter section of the actuator rod. An overmolded body protects the wires and electrical connections, and the switch contacts can be environmentally sealed using a rubber boot member. As the spring member encounters the larger diameter section of the actuator rod, the contacts are pulled apart thereby electrically opening a circuit. In the preferred embodiment, the switch contacts are mounted in a switch assembly on the open end of the C-shaped spring member and C-shaped molded body, and the spring member and overmolded body are mounted to the actuator housing to encircle the actuator rod.

One provision of the present invention is to provide a switching device to electrically indicate when a brake actuator has reached a predetermined travel limit.

Another provision of the present invention is to provide a switching device mounted to the outside of the actuator housing to electrically indicate when a brake actuator has reached a predetermined travel limit.

Another provision of the present invention is to provide a switching device actuated by a change in the diameter of the actuator rod of a brake actuator when the brake actuator has reached a predetermined travel limit.

Another provision of the present invention is to provide a switching device mounted to an open end of a C-shaped spring member having electrical contacts which extend to make electrical contact with each other when a brake actuator is within its travel limits.

Another provision of the present invention is to provide a spring member mounted to the outside of a brake actuator housing which encircles the actuator rod where the spring member is forced apart by a larger diameter section of the actuator rod when a predetermined travel limit position is reached.

The switching system of the present invention requires no additional assembly after the overmolding process except for the addition of a grease boot provided around the electric contacts. The molding process of the invention eliminates several loose parts provided in the prior art design; the loose parts of the prior art design are small, difficult to handle, require assembly and lacked the robust qualities of the overmolded body provided by the present invention. The overmolded material provides consistent location of the spring and contacts and protects the wires. The C-shaped spring member provides a positive load to the contacts in order to maintain a closed circuit.

The macro-composite design provides a steel spring interior diameter and a polycarbonate outer shape that work in concert to provide load to the contact points. The molded material assists in maintaining a load during cold temperatures when the steel spring relaxes and the molded material becomes stiff. Conversely, during high temperatures when the molded material relaxes the steel spring tends to coil tighter.

The C-shaped spring provides a wear surface for the air chamber push rod and protects the wires as the push rod passes back and forth through the center of the switch during normal operation. In the preferred design, the spring is formed with small holes around its circumference, and during the molding process molding material flows into these holes; thus providing a mechanical interlock between the spring and the molding material.

The C-shaped spring member is formed with a pair of tabs at each end at the open end of the C-shaped spring member, and the tabs straddle the wires that are crimped to the brass contact points. These tabs provide a mechanical interlock between the molding material and the spring and help prevent creep of the molding material to insure that the load of the spring is concentrated on the contact points.

The boot seal provided about the contact points provide a physical barrier to prevent foreign objects from violating the surface to surface engagement of the contacts. In addition, the boot provides a means to contain a non-conductive compound which further protects against corrosion and intrusion of dirt and moisture between the contacts.

The molded polycarbonate body allows the switch to be sandwiched between the air chamber and the retainer plate without corrosion.

These and other advantages will become more apparent with reference to the following description and associated drawings.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
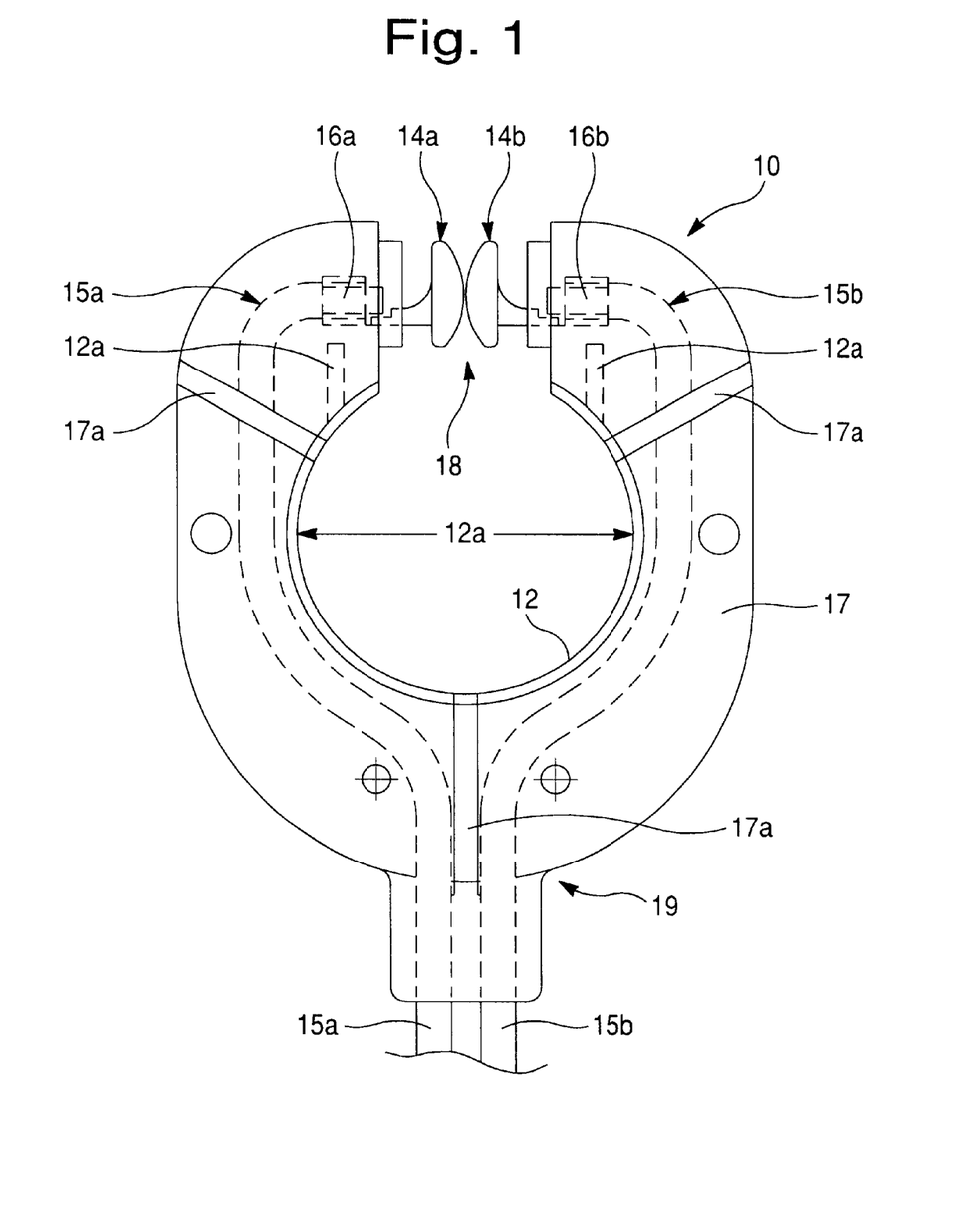
FIG. 1 is a cross-sectional view of the actuator rod, spring member and switch device of the present invention in a normal position.

Now referring to FIG. 1, a cross-sectional view of the travel limit sensor or switch 10 of the present invention in a normal position is shown. The travel limit switch 10 comprises a C-shaped spring member 12, two conductive (i.e., brass) contacts 14*a*, 14*b* each electrically connected to a separate 18 ga wire 15*a*, 15*b* at contact points 16*a*, 16*b*. The contact points 16*a*, 16*b* and wires 15*a*, 15*b* are overmolded with a polycarbonate body 17 in a manner such that the contacts 14*a*, 14*b* are in physical contact at the opening 18 of the C-shaped spring 12 and C-shaped body 17. The wires 15*a*, 15*b* are routed from each contact point in opposite directions about the outer diameter of the C-shaped spring until they meet again at the junction 19 located 180 degrees from the contact points 16*a*, 16*b*. The wires 15*a*, 15*b* are then routed out of the overmolded body 17 as two separate wire leads.

Figure 4:
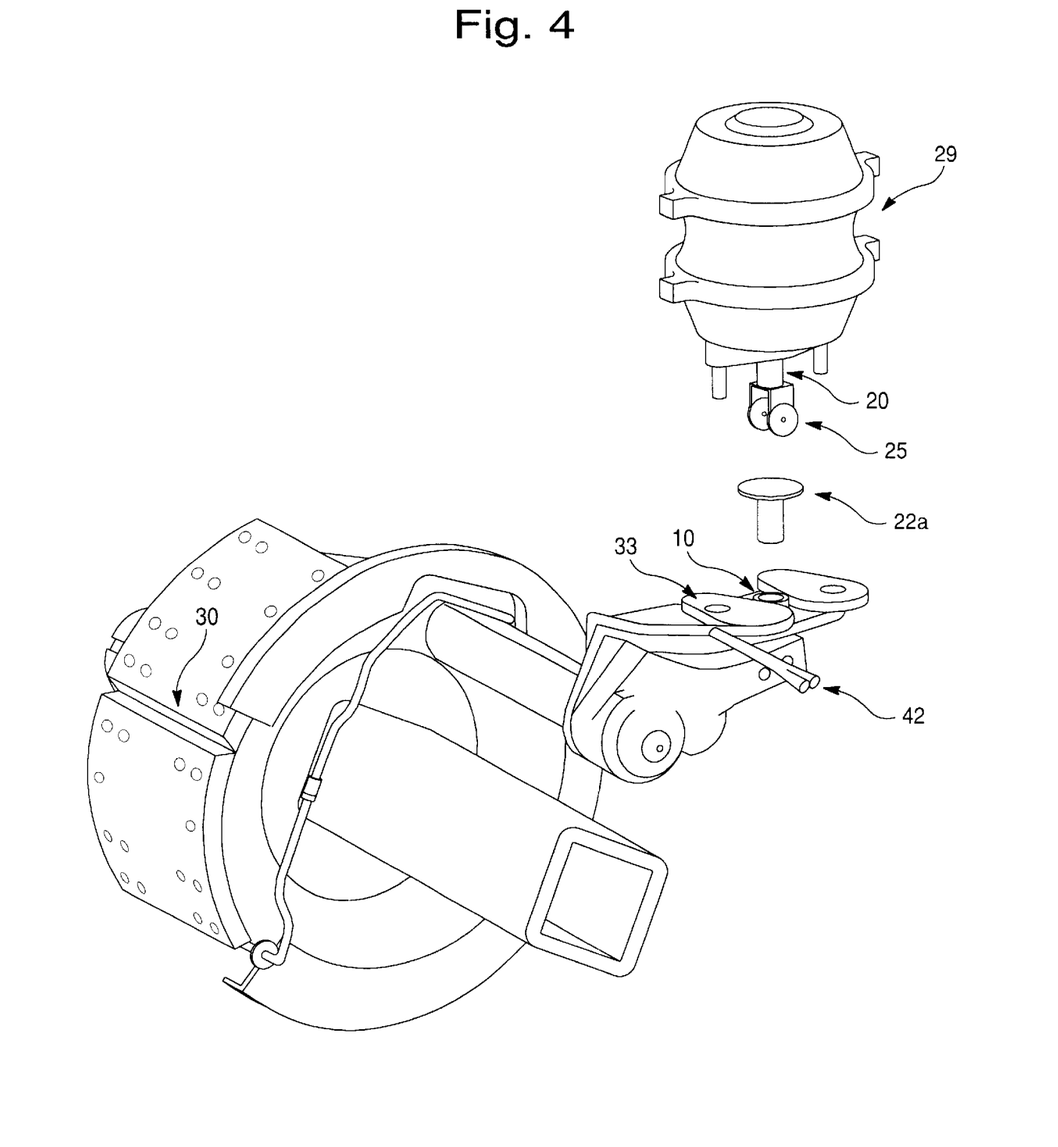
FIG. 4 is a partial perspective view of the present invention mounted to assembly.

A boot seal 18 is preferably provided around the contacts 14*a*, 14*b* (see FIG. 4).

The rod section 12*a* of the spring member 12 surrounds both the small diameter portion 24 in the normal operating condition and the larger diameter portion 22 of the actuator rod 20 when the actuator rod 20 has reached and/or exceeded a predetermined travel limit. The spring member 12 provides a contraction force to maintain contact between the contact points 16*a*, 16*b* when the spring member 12 is not in contact with the large diameter section 22 of the actuator rod 20. The switch assembly 10 is electrically connected to an electronics module 40 by wire connector 15*a* and to a brake shoe wear sensor 30 by connector 15*b* (see FIG. 5).

It would also be possible to fashion the actuator rod 20 having the large diameter section 22 in the area of acceptable travel of the actuator while the small diameter section 24 is in the area of unacceptable travel. In this configuration the switch assembly 10 would be normally open with the rod section 12*a* contacting the large diameter section 22 and then close when the small diameter section 24 enters the rod section 12*a*.

Figure 2:
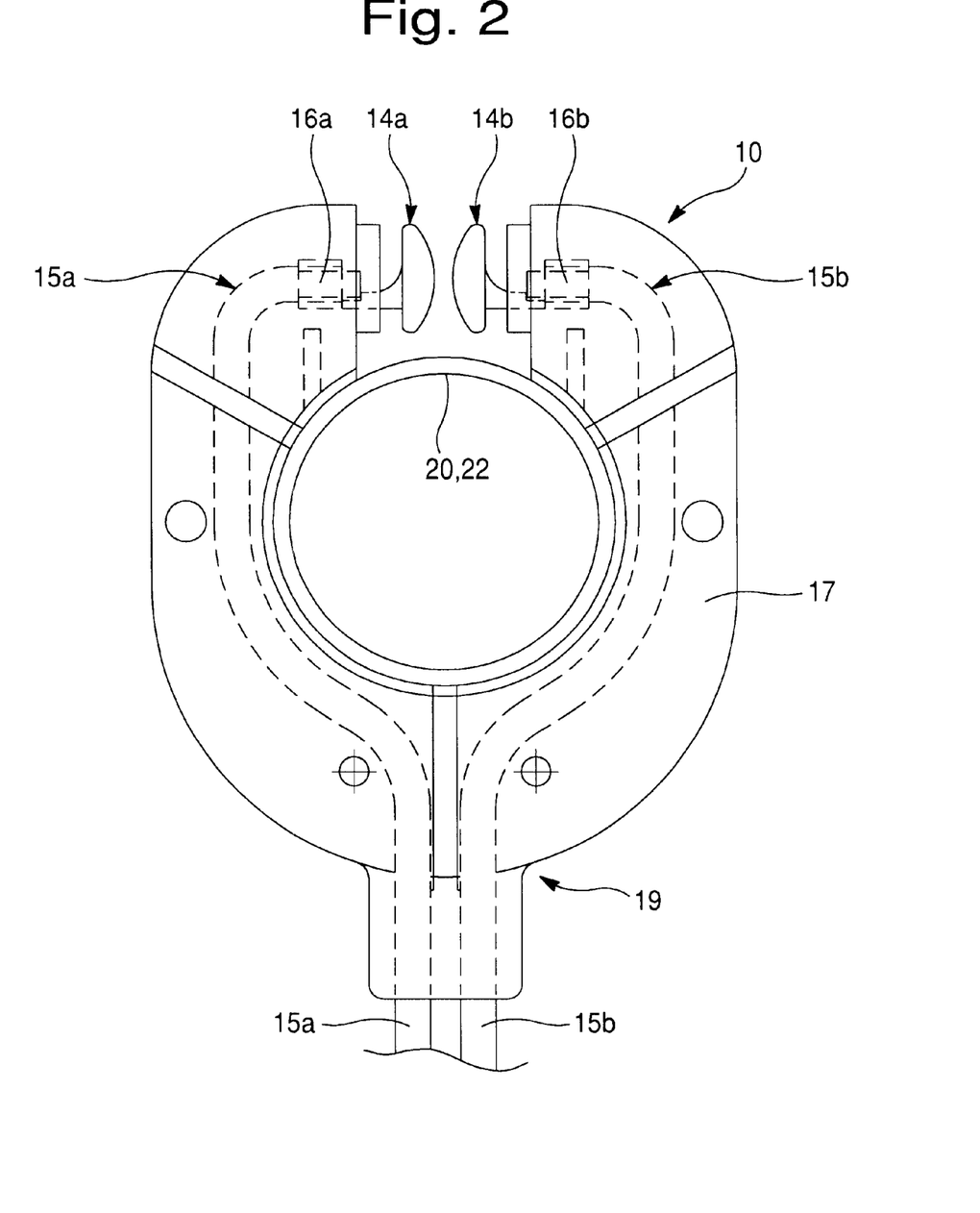
FIG. 2 is a cross-sectional view of the actuator rod, spring member and switch device of the present invention in a service position.

Now referring to FIG. 2 of the drawings, a cross-sectional view of the actuator rod 20, spring member 12 and switch device 10 of the present invention shows the travel limit sensor 10 and the actuator rod 20 in a service limit position. The actuator rod 20 passes through the spring member 12 without contact between the two elements, as long as the brake actuator rod 20 is within its normal operating range (see FIG. 1). When the predetermined travel limit is reached, the actuator rod 20 passes through the travel limit sensor 10 in its large diameter section 22 and the rod section 12*a* of spring 12 contacts the actuator rod 20 at its large diameter section 22. At this time, the C-shaped spring 12 and C-shaped body 17 spread out causing the first and second electrical contacts 14*a*, 14*b* to be forced apart, whereby the electrical circuit is opened between the wire connections to the wear sensor 23 and to the electronics module 40. The actuator rod 20 has moved out of the actuator housing 29 to the extent that the large diameter section 22 passes through the spring member 12 contacting and expanding the spring member 12 causing the first and second electrical contacts 14*a* and 14*b* to be pulled apart.

Figure 3:
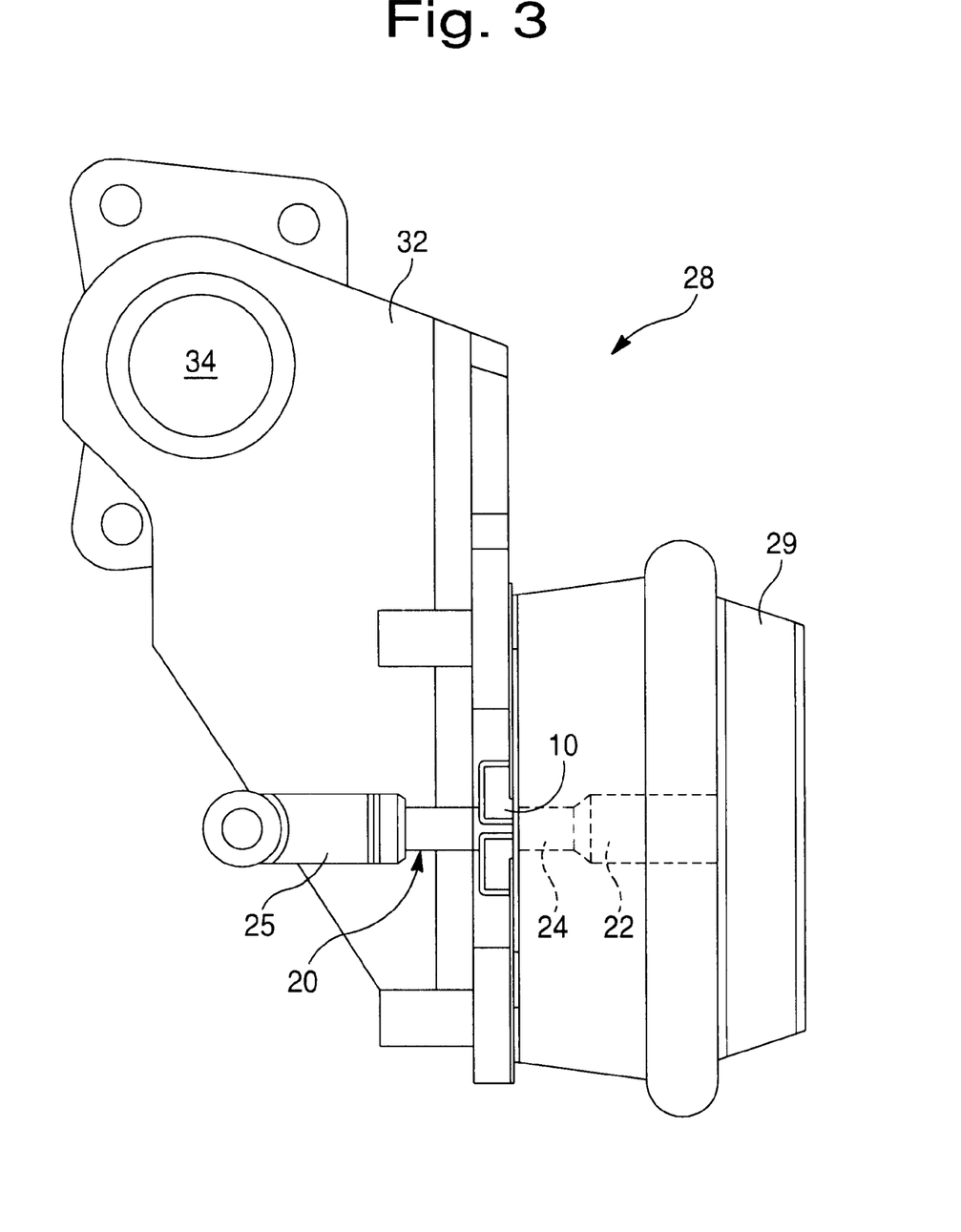
FIG. 3 is a side elevational view of the present invention mounted to a brake actuator housing.

Now referring to FIG. 3 of the drawings, a side elevational view of the present invention mounted to a brake actuator assembly 28 is shown. The actuator rod 20 axially extends from the actuator housing 29 and a rod clevis 25 is attached to the end of the actuator rod 20 for attachment to a slack adjuster (not shown) or another type of brake actuator linkage. Mounting bracket 32 is in some manner attached to the axle of the vehicle and supports the brake actuator 28 and a rotating shaft (not shown) which passes through shaft opening 34 to the brake and, for example, is connected at one end to the slack adjuster and at a second end to an S-cam. The rod clevis 25 is shown attached to the end of actuator rod 20 where the actuator rod 8 extends through the spring member 12. The push rod 20 has a large diameter section 22 and a small diameter section 24. The small diameter section 24 passes through the spring member 12 without sufficiently contacting the major section 12*a* to cause expansion of the spring 12 and body 17. The large diameter section 22 is not visible when it is located inside of the actuator housing 29 ("normal conditions"), but the service limit of travel is reached when the large diameter section 22 enters the spring member 12. In the preferred embodiment, a sleeve 22*a* is assembled on the push rod 20 inside the brake chamber to form the large diameter section (see FIG. 4). If the slack is out of adjustment, the sleeve 22*a* will protrude out of the chamber 29 and open the sensor switch 10 by separating the contacts 14*a*, 14*b*.

FIG. 4 is a partially exploded, perspective view of the present invention in relation to a brake assembly. As shown, the brake chamber 29 includes a pushrod 20 protruding from the chamber 29. A clevis 25 is threaded onto the pushrod 20 after the pushrod, is threaded through the sensor 10 and retaining plate 33. The pushrod 20 is threaded through the sensor 10 and retaining plate 33. The retaining plate 33 comprises a bolt pattern that matches the mounting studs of the chamber 29.

Also shown in FIG. 4 is the spatial and structural relationship of the brake wear sensor 30, the wear sensor wiring, the slack adjustment sensor 10 and the connector 42 which leads to the vehicle harness and electronics module 40.

Figure 5:
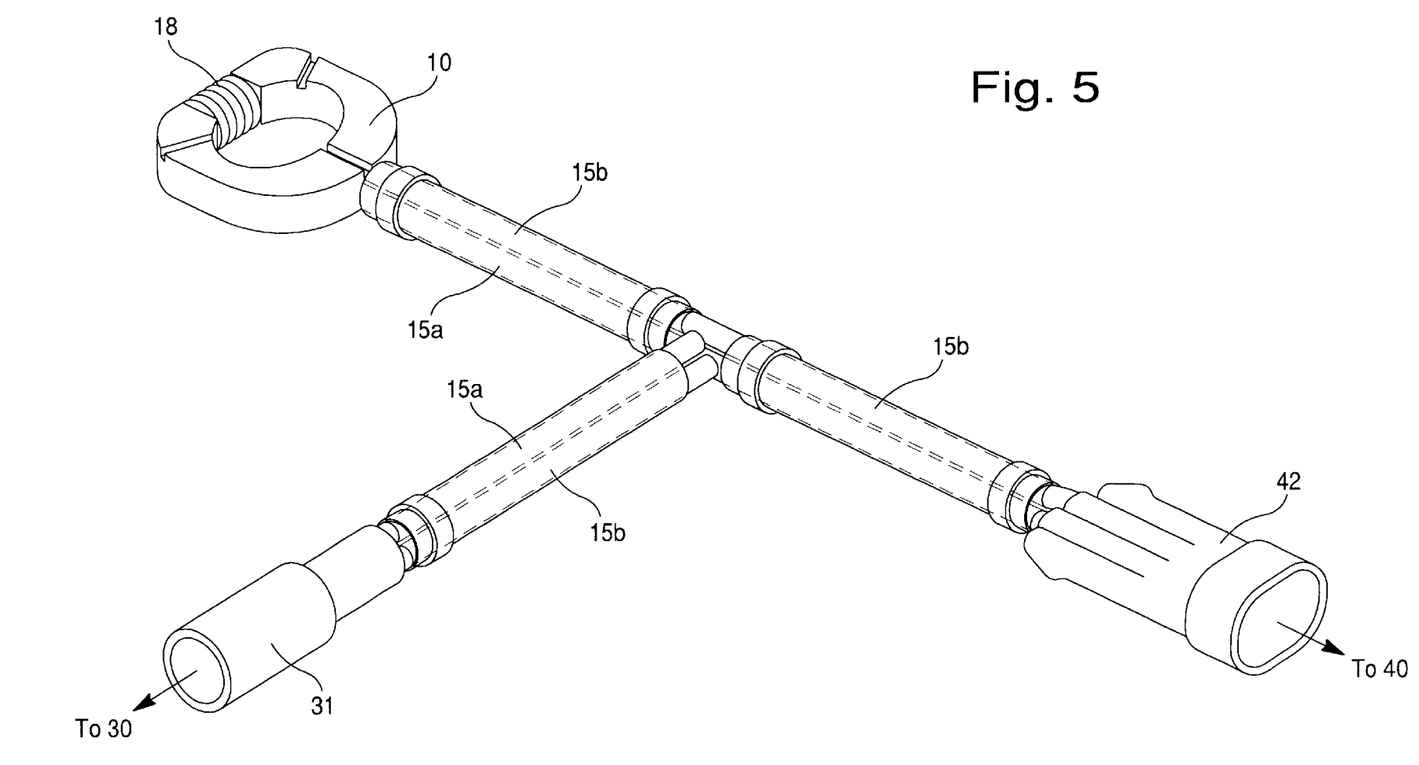
FIG. 5 is a perspective view of the single wire brake wear and adjustment sensing system according to the present invention.

FIG. 5 is a perspective view of the single wire brake wear and adjustment sensing system according to the present invention. The slack adjustment sensor 10 is electrically connected via wires 15*a*, 15*b* to the wear sensor 30 via the connector 31. Both the wear sensor 30 and the slack adjustment sensor 10 are electrically connected to the vehicle harness and electronic module 40 via the connector 42. The wires 15*a*, 15*b* are insulated by a series of conduits that protect the wiring.

The switching system of the present invention requires no additional assembly after the overmolding process except for the addition of a grease boot 18 provided around the electric contacts 14*a*, 14*b*. The molding process of the invention eliminates several loose parts which are small, difficult to handle, required assembly and lacked the robust qualities of the overmolded body provided by the present invention. The overmolded material provides consistent location of the spring 12 and contacts 14*a*, 14*b*, and protects the wires 15*a*, 15*b* from damage. The C-shaped spring member 12 provides a positive load to the contacts in order to maintain a closed circuit.

The macro-composite design provides a steel spring interior diameter and a polycarbonate outer shape that work in concert to provide load to the contact points. The molded body 17 assists in maintaining a load during cold temperatures when the steel spring 12 relaxes and the molded material becomes stiff. Conversely, during high temperatures when the molded material relaxes the steel spring tends to coil tighter.

The C-shaped spring 12 provides a wear surface for the air chamber push rod 20 and protects the wires 15a, 15b as the push rod 20 passes back and forth through the center of the switch during normal operation. In the preferred design, the spring is formed with small holes around its circumference, and during the molding process molding material flows into these holes; thus providing a mechanical interlock between the spring and the molding material.

The C-shaped spring member 12 is formed with a pair of tabs 12a at each end at the open end of the C-shaped spring member, and the tabs straddle the wires 15a, 15b that are crimped to the brass contact points 14a, 14b. These tabs 12a provide a mechanical interlock between the molding material and the spring and help prevent creep of the molding material to insure that the load of the spring is concentrated on the contact points.

The boot seal 18 provided about the contact points 14a, 14b provides a physical barrier to prevent foreign objects from violating the surface to surface engagement of the contacts. In addition, the boot provides a means to contain a non-conductive compound which further protects against corrosion and intrusion of dirt and moisture between the contacts.

The molded polycarbonate body allows the switch to be sandwiched between the air chamber and the retainer plate without corrosion. In the preferred embodiment, the molded body 17 is formed with weakened zones 17a that promote expansion of the molded body 17 when the large diameter portion 22 of the push rod 20 forces the contacts 14a, 14b apart.

Although this present invention has been described in its preferred form within a certain degree of particularity, it is understood that the present disclosure of the preferred embodiment has been made only by way of example, and that numerous changes in the detail construction in combination and arrangement of the elements may be resorted to without parting from the spirit and the scope of the invention as hereinafter claimed.

What is claimed is:

1. A brake actuator having an actuator rod connecting a vehicle brake to the brake actuator with a switch device mounted to the brake actuator to signal when the actuator rod reaches a predetermined travel limit position comprising:

an actuator housing having a base, said actuator rod extending therethrough, said actuator rod having a small section and a large section;

a spring member at least partially encircling said actuator rod, said spring member adapted to make contact with said large section when said actuator rod reaches the predetermined travel limit position;

a molded body disposed about said spring member;

a switch device mounted to said molded body separately from said spring member and adapted to change state when said spring member contacts said large section; and an electronic module electrically connected to said switch device for generating a diagnostic service signal.

2. The brake actuator of claim 1, wherein said molded body defines a C-shaped body and said switch device is disposed within an opening of said C-shaped body.

3. The brake actuator of claim 2, wherein said spring member is disposed along an inner peripheral surface of said C-shaped body.

4. The brake actuator of claim 1, wherein said spring member has a first partial loop section centered with said actuator rod along an inner periphery of said molded body.

5. The brake actuator of claim 1, wherein said switch device comprises first and second brass electrical contacts extending from said molded body and toward one another to thereby provide electrical conductivity through said first and second electrical contacts in a normal state.

6. The brake actuator of claim 1, wherein said switch device is a normally closed switch that opens when said spring member engages said large section of said actuator rod.

7. The sensor of claim 1, wherein said switch device comprises first and second electrical contacts extending from said molded body and toward one another to thereby provide electrical conductivity through said first and second electrical contacts in a normal state.

8. The sensor of claim 7, wherein said first and second electrical contacts are electrically connected to first and second wires, respectively, at an electrical connection and wherein said wires and an electrical connection are disposed within said molded body.

9. A brake actuator having an actuator rod connecting a vehicle brake to the brake actuator with a switch device mounted to the brake actuator to signal when the actuator rod reaches a predetermined travel limit position comprising:

an actuator housing having a base, said actuator rod extending therethrough, said actuator rod having a small section and a large section;

a spring member at least partially encircling said actuator rod, said spring member adapted to make contact with said large section when said actuator rod reaches the predetermined travel limit position;

a molded body disposed about said spring member;

a switch device mounted to said molded body and adapted to change state when said spring member contacts said large section; and an electronic module electrically connected to said switch device for generating a diagnostic service signal;

wherein said switch device further comprises a first electrical contact and a second electrical contact extending to make electrical contact with said first electrical contact; and wherein said switch device further comprises a first wire electrically connected to said first electrical contact and a second wire electrically connected to said second electrical contact, said first and second wires extending in opposite directions around said spring member.

10. The brake actuator of claim 9, wherein said switch device is shielded from the environment by a molded boot.

11. A sensor for detecting an abnormal position of a brake actuator having an actuator rod connecting a vehicle brake to the brake actuator to signal when the actuator rod reaches a predetermined travel limit position comprising:

a C-shaped molded body member;

a spring member disposed along an inner peripheral surface of said molded body member, said spring member adapted to make contact with an enlarged section of said actuator rod when said actuator rod reaches the predetermined travel limit position; and a switch device mounted to and disposed within an opening of said C-shaped molded body and adapted to change state when said spring member contacts said large section.

12. The sensor of claim 11, wherein said switch device further comprises a first electrical contact and a second electrical contact extending to make electrical contact with said first electrical contact.

13. The sensor of claim 11, wherein said spring member defines a partial loop section adapted to be centered with said actuator rod along an inner periphery of said molded body.

14. The brake actuator of claim 11, wherein said switch device is shielded from the environment by a molded boot.

15. The brake actuator of claim 11, wherein said switch device is a normally closed switch that is adapted to open when said spring member engages an enlarged section of said actuator rod.

16. A sensor for detecting an abnormal position of a brake actuator having an actuator rod connecting a vehicle brake to the brake actuator to signal when the actuator rod reaches a predetermined travel limit position comprising:

a molded body member;

a spring member disposed along an inner peripheral surface of said molded body member, said spring member adapted to make contact with an enlarged section of said actuator rod when said actuator rod reaches the predetermined travel limit position; and a switch device mounted to said molded body and adapted to change state when said spring member contacts said large section;

wherein said switch device further comprises a first electrical contact and a second electrical contact extending to make electrical contact with said first electrical contact; and wherein said switch device further comprises a first wire electrically connected to said first electrical contact and a second wire electrically connected to said second electrical contact, said first and second wires extending in opposite directions around said spring member.

* * * * *